United States Patent
Jung et al.

(10) Patent No.: US 9,860,018 B2
(45) Date of Patent: Jan. 2, 2018

(54) APPARATUS AND METHOD FOR PERFORMING CHANNEL DECODING OPERATION BASED ON EFFECTIVE NOISE IN MOBILE COMMUNICATION SYSTEM

(71) Applicants: Young Seok Jung, Gyeonggi (KR); Min Goo Kim, Gyeonggi (KR); In Hyoung Kim, Gyeonggi (KR); Chae Hag Yi, Gyeonggi (KR)

(72) Inventors: Young Seok Jung, Gyeonggi (KR); Min Goo Kim, Gyeonggi (KR); In Hyoung Kim, Gyeonggi (KR); Chae Hag Yi, Gyeonggi (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/003,388

(22) Filed: Jan. 21, 2016

(65) Prior Publication Data

US 2016/0211943 A1 Jul. 21, 2016

(30) Foreign Application Priority Data

Jan. 21, 2015 (KR) .................. 10-2015-0009980

(51) Int. Cl.
*H04L 27/06* (2006.01)
*H04L 1/00* (2006.01)
*H04L 25/02* (2006.01)

(52) U.S. Cl.
CPC .......... *H04L 1/0054* (2013.01); *H04L 1/0047* (2013.01); *H04L 25/0202* (2013.01)

(58) Field of Classification Search
CPC .......... H03M 13/1111; H03M 13/1191; H03M 13/27; H03M 13/2792; H03M 13/2906; H03M 13/2948; H03M 13/612; H03M 13/6325; H03M 13/6337; H04L 1/005; H04L 1/0059; H04L 1/0071; H04L 1/004; H04L 25/0222; H04L 25/02
See application file for complete search history.

(56) References Cited

U.S. PATENT DOCUMENTS

| | | | |
|---|---|---|---|
| 6,891,897 B1 * | 5/2005 | Bevan | H04L 1/005 375/240 |
| 2005/0195765 A1 * | 9/2005 | Sharon | H04B 1/7176 370/330 |
| 2006/0078075 A1 * | 4/2006 | Stamoulis | H04L 25/03171 375/346 |
| 2007/0019752 A1 * | 1/2007 | Kim | H03M 13/45 375/260 |
| 2007/0162827 A1 * | 7/2007 | Walton | H04L 1/06 714/774 |

(Continued)

*Primary Examiner* — Khanh C Tran
(74) *Attorney, Agent, or Firm* — The Farrell Law Firm, P.C.

(57) ABSTRACT

A method and apparatus are provided for performing a channel decoding operation based on effective noise in a mobile communication system. The method includes detecting effective noise including additive noise that occurs in a channel environment between the signal receiving apparatus and a signal transmitting apparatus and channel estimation noise that occurs during a channel estimating operation the signal receiving apparatus; generating a log likelihood ratio (LLR) based on the detected effective noise; and performing channel decoding based on the generated LLR.

18 Claims, 9 Drawing Sheets

(56) References Cited

U.S. PATENT DOCUMENTS

| | | | |
|---|---|---|---|
| 2010/0051865 A1* | 3/2010 | Yoshino | C09K 19/20 252/299.61 |
| 2011/0051865 A1* | 3/2011 | Mergen | H04B 1/71072 375/347 |
| 2013/0051444 A1 | 2/2013 | Roh | |

* cited by examiner

APPARATUS AND METHOD FOR PERFORMING CHANNEL DECODING OPERATION BASED ON EFFECTIVE NOISE IN MOBILE COMMUNICATION SYSTEM

PRIORITY

This application claims priority under 35 U.S.C. §119(a) to Korean Patent Application Serial No. 10-2015-0009980, which was filed in the Korean Intellectual Property Office on Jan. 21, 2015, the entire disclosure of which is incorporated herein by reference.

BACKGROUND

1. Field of the Disclosure

The present disclosure relates generally to an apparatus and method for performing a channel decoding operation based on an effective noise in a mobile communication system, and more particularly, to an apparatus and method for channel decoding based on a log likelihood ratio (LLR), which is based on an effective noise in a mobile communication system.

2. Description of the Related Art

In a wireless channel environment of a communication system, errors inevitably occur due to a number of factors such as multipath interference, shadowing, propagation attenuation, time-variant noise, interference, fading, etc. As a result of these errors, information loss occurs.

Further, this type of information loss results in distortion of a transmitted signal, degrading the overall performance of the mobile communication system.

Various error-control schemes have been proposed in order to improve the reliability of a communication by addressing the information loss. For example, a typical error-control scheme uses an error-correcting code, such as a forward error correction (FEC) code. Examples of the FEC code include a convolutional code, a turbo code, a low density parity check (LDPC) code, etc.

Additionally, various channel decoding schemes have been proposed, e.g., a channel decoding scheme based on an LLR.

Effective noise experienced by a channel decoder in a signal receiving apparatus includes noise that occurs during a channel estimating operation performed when the signal receiving apparatus performs channel decoding and additive noise that occurs in a communication channel environment between a signal transmitting apparatus and the signal receiving apparatus. Generally, the noise that occurs during the channel estimating operation is much less than the additive noise that occurs in the communication channel environment between the signal transmitting apparatus and the signal receiving apparatus. As a result, conventional channel decoding schemes address only a channel decoding operation which considers only additive noise occurring in the communication channel environment between the signal transmitting apparatus and the signal receiving apparatus. That is, the conventional channel decoding schemes do not consider the noise that occurs while a channel estimating operation is performed, thereby decreasing the reliability of the channel decoding operations.

SUMMARY

Accordingly, the present disclosure is made to address at least the above-mentioned problems and/or disadvantages and to provide at least the advantages described below.

An aspect of the present disclosure is to provide a scheme for performing channel decoding in consideration of noise that occurs while a channel estimating operation is performed and in consideration of additive noise that occurs in a communication channel environment between a signal transmitting apparatus and a signal receiving apparatus.

Another aspect of the present disclosure is to provide an apparatus and method for performing channel decoding based on effective noise in a mobile communication system.

Another aspect of the present disclosure is to provide an apparatus and method for performing channel decoding using effective noise, in consideration of a channel environment, in a mobile communication system.

Another aspect of the present disclosure is to provide an apparatus and method for performing channel decoding using an LLR, which is generated based on effective noise in a mobile communication system.

Another aspect of the present disclosure is to provide an apparatus and method for performing channel decoding using an LLR that is generated based on channel estimation noise, which is estimated through mathematical modeling in a mobile communication system.

Another aspect of the present disclosure is to provide an apparatus and method for performing channel decoding using an LLR that is generated based on channel estimation noise, which is estimated through simulation in a mobile communication system.

Another aspect of the present disclosure is to provide an apparatus and method for performing channel decoding using an LLR that is generated based on channel estimation noise, which is estimated using a statistical characteristic in a mobile communication system.

In accordance with an aspect of the present disclosure, a method for performing, by a signal receiving apparatus in a mobile communication system, a channel decoding operation based on effective noise is provided. The method includes detecting effective noise including additive noise that occurs in a channel environment between the signal receiving apparatus and a signal transmitting apparatus and channel estimation noise that occurs during a channel estimating operation the signal receiving apparatus; generating a log likelihood ratio (LLR) based on the detected effective noise; and performing channel decoding based on the generated LLR.

In accordance with another aspect of the present disclosure, a method for performing, by a signal receiving apparatus in a mobile communication system, a channel decoding operation based on effective noise is provided. The method includes detecting a channel estimation noise that occurs during a channel estimating operation performed in the signal receiving apparatus; generating a log likelihood ratio (LLR) based on the channel estimation noise; and performing a channel decoding operation based on the generated LLR.

In accordance with another aspect of the present disclosure, a signal receiving apparatus in a mobile communication system is provided. The signal receiving apparatus includes a receiver; and a controller configured to detect an effective noise including additive noise that occurs in a channel environment between the signal receiving apparatus and a signal transmitting apparatus and channel estimation noise that occurs during a channel estimating operation the signal receiving apparatus, to generate a log likelihood ratio (LLR) based on the detected effective noise, and to decode a channel based on the generated LLR.

In accordance with another aspect of the present disclosure, a signal receiving apparatus in a mobile communication system is provided. The signal receiving apparatus includes a receiver; and a controller configured to detect channel estimation noise that occurs during a channel estimating operation performed in the signal receiving apparatus, to generate a log likelihood ratio (LLR) based on the channel estimation noise, and to decode a channel based on the generated LLR.

In accordance with another aspect of the present disclosure, a signal receiving apparatus in a mobile communication system is provided. The signal receiving apparatus includes an effective noise detector configured to detect effective noise including additive noise that occurs in a channel environment between the signal receiving apparatus and a signal transmitting apparatus and channel estimation noise that occurs during a channel estimating operation the signal receiving apparatus; a demodulator configured to generate a log likelihood ratio (LLR) based on the detected effective noise; and a decoder configured to perform a channel decoding operation based on the generated LLR.

In accordance with another aspect of the present disclosure, a chip set is provided. The chip set is configured to detect effective noise including additive noise that occurs in a channel environment between a signal receiving apparatus and a signal transmitting apparatus and channel estimation noise that occurs during a channel estimating operation the signal receiving apparatus; generate a log likelihood ratio (LLR) based on the detected effective noise; and perform channel decoding based on the generated LLR.

In accordance with another aspect of the present disclosure, a chip set is provided. The chip set is configured to detect a channel estimation noise that occurs during a channel estimating operation performed in a signal receiving apparatus; generate a log likelihood ratio (LLR) based on the channel estimation noise; and perform a channel decoding operation based on the generated LLR.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
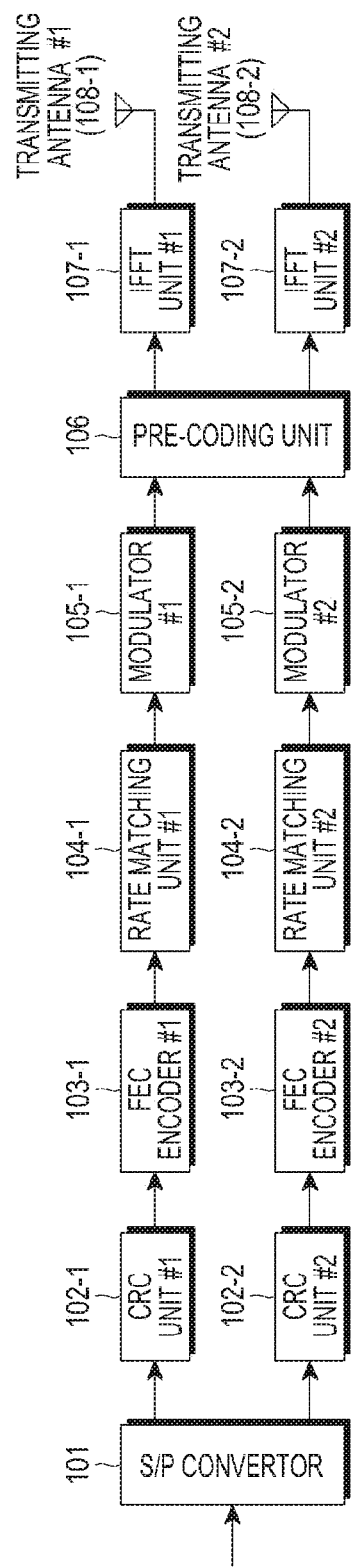
FIG. 1 illustrates a signal transmitting apparatus in a long term evolution (LTE) mobile communication system supporting a multiple-input multiple-output (MIMO) scheme according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as mere examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to their dictionary meanings, and are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and etc., may be used to describe various components, those components are not limited by these terms. The terms are used only for distinguishing one component from another component. For example, a first component may be referred to as a second component and likewise, a second component may also be referred to as a first component, without departing from the teaching of the inventive concept.

Additionally, the term "and/or" used herein includes any and all combinations of one or more of the associated listed items.

As used herein, singular forms are intended to include plural forms as well, unless the context clearly indicates otherwise.

It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

Further, an electronic device may be a smart home appliance with communication functionality. For example, a smart home appliance may be a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync®, Apple TV®, or Google TV®), a gaming console, an electronic dictionary, an electronic key, a camcorder, an electronic picture frame, and/or the like.

Further, an electronic device may be a medical device (e.g., a magnetic resonance angiography (MRA) device, a magnetic resonance imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., a naval navigation device, a gyroscope, or a compass), an avionic electronic device, a security device, an industrial or consumer robot, and/or the like.

Additionally, an electronic device may be furniture, part of a building/structure, an electronic board, electronic signature receiving device, a projector, various measuring devices (e.g., water, electricity, gas or electro-magnetic wave measuring devices), etc., which include communication functionality.

An electronic device may also be any combination of the foregoing devices.

In addition, it will be apparent to one having ordinary skill in the art that an electronic device according to various embodiments of the present disclosure is not limited to the foregoing devices.

Herein, effective noise includes noise that occurs during a channel estimating operation that is performed in a channel decoding operation by a signal receiving apparatus and additive noise that occurs in a communication channel environment between a signal transmitting apparatus and the signal receiving apparatus. For convenience, the noise that occurs during the channel estimating operation will be called "channel estimation noise".

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same.

It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

A method and apparatus according to embodiments of the present disclosure may be applied to various communication systems such as an institute of electrical and electronics engineers (IEEE) 802.11ac communication system, an IEEE 802.16 communication system, a digital video broadcasting system such as a mobile broadcasting service such as a digital multimedia broadcasting (DMB) service, a digital video broadcasting-handheld (DVP-H) service, an advanced television systems committee-mobile/handheld (ATSC-M/H) service, etc., and an internet protocol television (IPTV) service, a moving picture experts group (MPEG) media transport (MMT) system, an evolved packet system (EPS), an LTE mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an IEEE mobile communication system, a mobile internet protocol (Mobile IP) system, and/or the like.

Although embodiments of the present disclosure will be described below with reference to an LTE mobile communication system that supports a MIMO scheme, the present disclosure is not limited thereto.

FIG. 1 illustrates a signal transmitting apparatus in an LTE mobile communication system supporting a MIMO scheme according to an embodiment of the present disclosure. Specifically, in FIG. 1, the signal transmitting apparatus uses two transmitting antennas, i.e., a transmitting antenna #1 108-1 and a transmitting antenna #2 108-2. However, the number of antennas is not limited to two.

Referring to FIG. 1, the signal transmitting apparatus includes a serial to parallel (S/P) convertor 101, two cyclic redundancy check (CRC) units, i.e., a CRC unit #1 102-1 and a CRC unit #2 102-2, two FEC encoders, i.e., an FEC encoder #1 103-1 and an FEC encoder #2 103-2, two rate matching units, i.e., a rate matching unit #1 104-1 and a rate matching unit #2 104-2, two modulators, i.e., a modulator #1 105-1 and a modulator #2 105-2, a pre-coding unit 106, two inverse fast Fourier transform (IFFT) units, i.e., an IFFT unit #1 107-1 and an IFFT unit #2 107-2, and the two transmitting antennas, i.e., the transmitting antenna #1 108-1 and the transmitting antenna #2 108-2.

When an information bit stream is to be transmitted, the information bit stream is input to the S/P convertor 101. The S/P convertor 101 converts the input information bit stream into two information bit streams and outputs the two information bit streams to the CRC unit #1 102-1 and the CRC unit #2 102-2, respectively.

The CRC unit #1 102-1 performs a CRC checking operation on one of the information bit streams output from the S/P convertor 101 and outputs the CRC checked signal to the FEC encoder #1 103-1. The FEC encoder #1 103-1 encodes the signal output from the CRC unit #1 102-1 based on a preset FEC encoding scheme and outputs the encoded signal to the rate matching unit #1 104-1. In an LTE mobile communication system, a convolutional code is used as an FEC code for a control channel signal, and a turbo code is used as an FEC code for a traffic channel signal. Accordingly, if a signal to be encoded is a control channel signal, the FEC encoder #1 103-1 encodes using the convolutional code, and if the signal to be encoded is a traffic channel signal, the FEC encoder #1 103-1 encodes using the turbo code.

The rate matching unit #1 104-1 performs a rate matching operation on the signal output from the FEC encoder #1 103-1 based on a preset rate matching scheme and outputs the rate matched signal to the modulator #1 105-1. The modulator #1 105-1 performs a modulating operation on the signal output from the rate matching unit #1 104-1 based on a preset modulation scheme and outputs the modulated signal to the pre-coding unit 106.

Similarly, the CRC unit #2 102-2 performs a CRC checking operation on the other information bit stream output from the S/P convertor 101 and outputs the CRC checked signal to the FEC encoder #2 103-2. The FEC encoder #2 103-2 encodes the signal output from the CRC unit #2 102-2 based on a preset FEC encoding scheme and outputs the encoded signal to the rate matching unit #2 104-2. Again, if a signal to be encoded is a control channel signal, the FEC encoder #2 103-2 encodes using the convolutional code, and if the signal to be encoded is a traffic channel signal, the FEC encoder #2 103-2 encodes using the turbo code.

The rate matching unit #2 104-2 performs a rate matching operation on the signal output from the FEC encoder #2 103-2 based on a preset rate matching scheme and outputs the rate matched signal to the modulator #2 105-2. The modulator #2 105-2 performs a modulating operation on the signal output from the rate matching unit #2 104-2 based on a preset modulation scheme and outputs the modulated signal to the pre-coding unit 106.

The pre-coding unit 106 performs a pre-coding operation on the signals output from the modulator #1 105-1 and the modulator #2 105-2 based on a preset pre-coding scheme and outputs the pre-coded signals to the IFFT unit #1 107-1 and the IFFT unit #2 107-2, respectively. For example, the pre-coding scheme may be generated based on feedback information which is received from a signal receiving apparatus.

The IFFT unit #1 107-1 performs an IFFT operation on the signal output from the pre-coding unit 106 and the IFFT performed signal is then transmitted to the signal receiving apparatus through the transmitting antenna #1 108-1.

The IFFT unit #2 107-2 performs an IFFT operation on the signal output from the pre-coding unit 106 and the IFFT performed signal is then transmitted to the signal receiving apparatus through the transmitting antenna #2 108-2.

While the S/P convertor 101, the CRC unit #1 102-1 and the CRC unit #2 102-2, the FEC encoder #1 103-1 and the FEC encoder #2 103-2, the rate matching unit #1 104-1 and the rate matching unit #2 104-2, the modulator #1 105-1 and the modulator #2 105-2, the pre-coding unit 106, the IFFT unit #1 107-1 and the IFFT unit #2 107-2, and the transmitting antenna #1 108-1 and the transmitting antenna #2 108-2 are illustrated and described as separate components, alternatively, two or more of the S/P convertor 101, the CRC unit #1 102-1 and the CRC unit #2 102-2, the FEC encoder #1 103-1 and the FEC encoder #2 103-2, the rate matching unit #1 104-1 and the rate matching unit #2 104-2, the modulator #1 105-1 and the modulator #2 105-2, the pre-coding unit 106, the IFFT unit #1 107-1 and the IFFT unit #2 107-2, and the transmitting antenna #1 108-1 and the transmitting antenna #2 108-2 may be incorporated into a single component.

Figure 2:
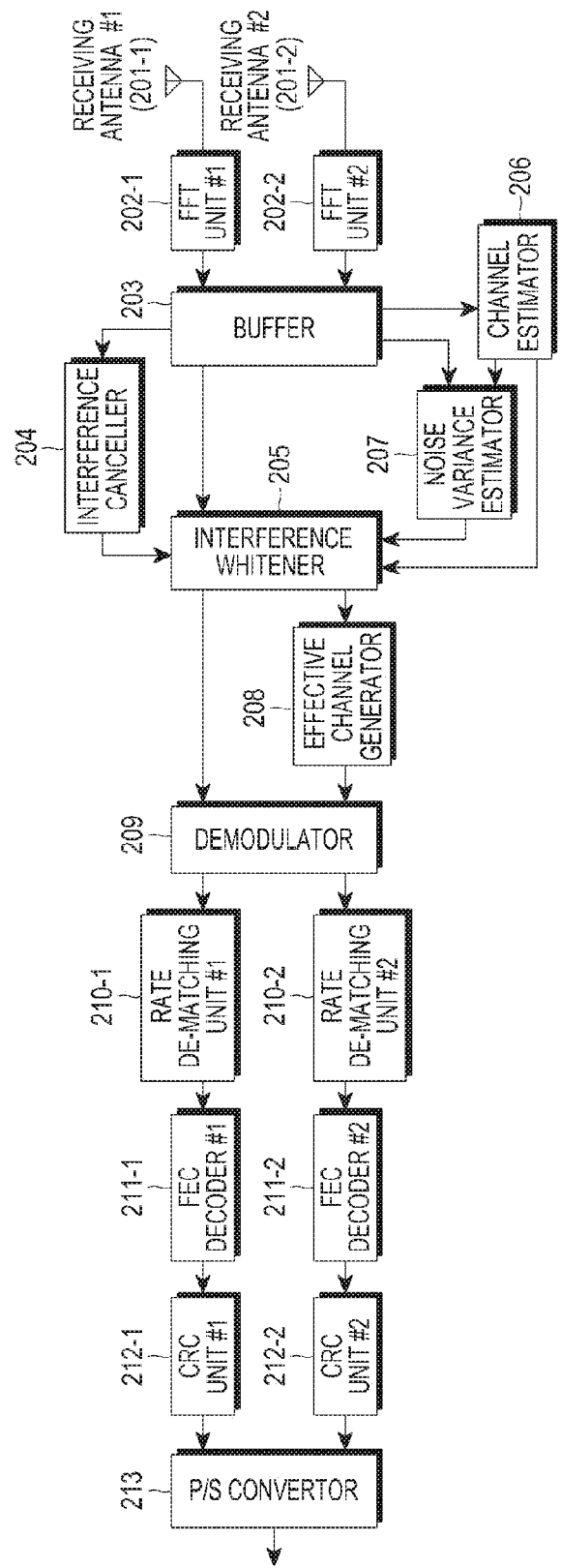
FIG. 2 illustrates a signal receiving apparatus in an LTE mobile communication system supporting a MIMO scheme according to an embodiment of the present disclosure.

FIG. 2 illustrates a signal receiving apparatus in an LTE mobile communication system supporting a MIMO scheme according to an embodiment of the present disclosure. Specifically, in FIG. 2, the signal receiving apparatus uses two receiving antennas, i.e., a receiving antenna #1 201-1 and a receiving antenna #2 201-2. However, the number of antennas is not limited to two.

Referring to FIG. 2, the signal receiving apparatus includes the two receiving antennas, i.e., the receiving antenna #1 201-1 and the receiving antenna #2 201-2, two fast Fourier transform (FFT) units, i.e., an FFT unit #1 202-1 and an FFT unit #2 202-2, a buffer 203, an interference canceller 204, an interference whitener 205, a channel estimator 206, a noise variance estimator 207, an effective channel generator 208, a demodulator 209, two rate de-matching units, i.e., a rate de-matching unit #1 210-1 and a rate de-matching unit #2 210-2, two FEC decoders, i.e., an FEC decoder #1 211-1 and an FEC decoder #2 211-2, two CRC units, i.e., a CRC unit #1 212-1 and a CRC unit #2 212-2, and a parallel to serial (P/S) convertor 213.

A signal received through the receiving antenna #1 201-1 is input to the FFT unit #1 202-1, which performs an FFT operation on the signal and outputs an FFT performed signal to the buffer 203.

Similarly, a signal received through the receiving antenna #2 201-2 is input to the FFT unit #2 202-2, which performs an FFT operation on the signal and outputs an FFT performed signal to the buffer 203.

The buffer 203 buffers the signals output from the FFT unit #1 202-1 and the FFT unit #2 202-2, and outputs the buffered signals to the interference canceller 204, the channel estimator 206, and the noise variance estimator 207.

The interference canceller 204 performs an interference cancelling operation on the signal output from the buffer 203 based on a preset interference cancellation scheme and outputs the interference cancelled signal to the interference whitener 205. If the signal receiving apparatus is able to estimate all or a part of an interference signal, the interference canceller 204 performs an interference cancelling operation. In an LTE mobile communication system, a cell-specific reference signal cancellation scheme in which an interference signal from an interference cell is cancelled is used for interference cancellation. Accordingly, in FIG. 2, the interference canceller 204 performs the interference cancelling based on the cell-specific reference signal cancellation scheme; however, the interference cancellation scheme may be implemented with various other formats.

The channel estimator 206 performs a channel estimating operation on the signal output from the buffer 203 based on a preset channel estimation scheme and outputs the channel estimated signal to the noise variance estimator 207 and the interference whitener 205. For example, the channel estimator 206 performs the channel estimating operation based on a preset reference signal.

The noise variance estimator 207 performs a noise variance estimating operation on the signal output from the buffer 203 and the signal output from the channel estimator 206 and outputs the noise variance estimated signal to the interference whitener 205. The noise variance estimator 207 estimates a variance of additive noise from a received signal based on the reference signal and the signal output from the channel estimator 206, i.e., a channel estimation value. Herein, the additive noise includes an interference signal.

The interference whitener 205 performs an interference whitening operation on the signal output from the buffer 203, the signal output from the interference canceller 204, the signal output from the channel estimator 206, and the signal output from the noise variance estimator 207 based on a preset interference whitening scheme and outputs the interference whitened signal to the effective channel generator 208 and the demodulator 209. If the additive noise, which is estimated in the noise variance estimator 207, is spatially correlated, the interference whitener 205 applies the same whitening filter to the channel estimation value that is estimated in the channel estimator 206 and the received signal in order to implement a simple demodulator. The interference whitener 205 outputs a noise variance to the demodulator 209, after performing the interference whitening operation. The received signal may be the signal output from the buffer 203 or the signal output from the interference canceller 204 according to whether an interference signal is to be canceled.

The effective channel generator 208 applies an influence of a pre-coding scheme applied in a signal transmitting apparatus to the signal output from the interference whitener 205, and outputs the signal to which the influence of the pre-coding scheme is applied to the demodulator 209.

In an LTE mobile communication system, two types of reference signal signals, i.e., a cell-specific reference signal and a UE-specific reference signal may be used for channel estimation. The cell-specific reference signal is commonly used for all UEs, and the UE-specific reference signal is used for a specific UE. In the LTE mobile communication system, a pre-coding scheme is not applied to the cell-specific reference signal. Accordingly, the effective channel generator 208 applies the influence of the pre-coding scheme to the signal output from the interference whitener 205.

Alternatively, in a LTE mobile communication system, a pre-coding scheme may be applied to the UE-specific reference signal. In this case, the effective channel generator 208 may be omitted, or does not perform any operation even though the effective channel generator 208 is implemented.

The demodulator 209 performs a demodulating operation on the signal output from the interference whitener 205 and the signal output from the effective channel generator 208 based on a demodulation scheme which corresponds to a modulation scheme used in the signal transmitting apparatus, and outputs the demodulated signal to the rate de-matching unit #1 210-1 and the rate de-matching unit #2 210-2. The demodulator 209 generates an LLR using the interference whitened effective channel, a received signal (or a received signal from which the interference signal is cancelled), and a noise variance to output the generated LLR to the rate de-matching unit #1 210-1 and the rate de-matching unit #2 210-2.

The rate de-matching unit #1 210-1 performs a rate de-matching operation on the signal output from the demodulator 209 based on a rate de-matching scheme that corresponds to a rate matching scheme used in the signal transmitting apparatus, and outputs the rate de-matched signal to the FEC decoder #1 211-1. The FEC decoder #1 211-1 decodes the signal output from the rate de-matching unit #1 210-1 based on an FEC decoding scheme that corresponds to an FEC coding scheme used in the signal transmitting apparatus, and outputs the FEC decoded signal to the CRC unit #1 212-1. The CRC unit #1 212-1 performs a CRC checking operation on the signal output from the FEC decoder #1 211-1 and outputs the CRC checked signal to the P/S convertor 213.

The rate de-matching unit #2 210-2 performs a rate de-matching operation on the signal output from the demodulator 209 based on a rate de-matching scheme that corresponds to a rate matching scheme used in the signal transmitting apparatus, and outputs the rate de-matched signal to the FEC decoder #2 211-2. The FEC decoder #2 211-2 decodes the signal output from the rate de-matching unit #2 210-2 based on an FEC decoding scheme that corresponds to an FEC coding scheme used in the signal transmitting apparatus, and outputs the FEC decoded signal to the CRC unit #2 212-2. The CRC unit #2 212-2 performs a CRC checking operation on the signal output from the FEC decoder #2 211-2 and outputs the CRC checked signal to the P/S convertor 213.

The P/S convertor 213 converts the signals output from the CRC unit #1 212-1 and the CRC unit #2 212-2 into a serial signal and outputs the serial signal.

While the receiving antenna #1 201-1 and the receiving antenna #2 201-2, the FFT unit #1 202-1 and the FFT unit #2 202-2, the buffer 203, the interference canceller 204, the interference whitener 205, the channel estimator 206, the noise variance estimator 207, the effective channel generator 208, the demodulator 209, the rate de-matching unit #1 210-1 and the rate de-matching unit #2 210-2, the FEC decoder #1 211-1 and the FEC decoder #2 211-2, the CRC unit #1 212-1 and the CRC unit #2 212-2, and the P/S convertor 213 are illustrated and described as separate components, alternatively, two or more of the receiving antenna #1 201-1 and the receiving antenna #2 201-2, the FFT unit #1 202-1 and the FFT unit #2 202-2, the buffer 203, the interference canceller 204, the interference whitener 205, the channel estimator 206, the noise variance estimator 207, the effective channel generator 208, the demodulator 209, the rate de-matching unit #1 210-1 and the rate de-matching unit #2 210-2, the FEC decoder #1 211-1 and the FEC decoder #2 211-2, the CRC unit #1 212-1 and the CRC unit #2 212-2, and the P/S convertor 213 may be incorporated into a single component.

When a transmitted symbol vector transmitted by a signal transmitting apparatus is x, and a received symbol vector received by a signal receiving apparatus is y, the transmitted symbol vector x may be expressed as shown in Equation (1).

$$x = [x_1, x_2]^T \quad (1)$$

In Equation (1), x, denotes a transmitted symbol from the ith transmitting antenna, and T denotes a transpose operation.

If the signal transmitting apparatus transmits the transmitted symbol vector x, the received symbol vector y may be expressed as shown in Equation (2).

$$y = Hx + n = \begin{pmatrix} h_{1,1} & h_{2,1} \\ h_{1,2} & h_{2,2} \end{pmatrix} \begin{pmatrix} x_1 \\ x_2 \end{pmatrix} + \begin{pmatrix} n_1 \\ n_2 \end{pmatrix} \quad (2)$$

In Equation (2), $h_{i,j}$ denotes a channel gain between an ith transmitting antenna and a jth receiving antenna, and $x_i$ denotes a transmitted symbol from the ith transmitting antenna. In Equation (2), $n_i$ denotes additive noise from the ith receiving antenna, and has power (or a variance) of $\sigma^2$. The additive noise includes an interference signal.

In an LTE mobile communication system, generally, noise of a receiving antenna is considered along with an influence of the interference signal. In this case, additive noises of receiving antennas are different, and may be spatially correlated, however, it will be assumed that power of an additive noise per receiving antenna is the same, and the additive noise per receiving antenna is spatially uncorrelated. In this case, the additive noise becomes equal to noise to which a whitening filter has been applied.

An optimal LLR for a channel decoder may be detected as shown in Equation (3) and Equation (4) through a Log-Maximum A Posteriori (MAP) scheme.

$$LLR(b_{k,i}) = \log\left(\frac{\Sigma_{x \in X_{k,i}^+} \exp(-(y - Hx)^H R^{-1}(y - Hx))}{\Sigma_{x \in X_{k,i}^-} \exp(-(y - Hx)^H R^{-1}(y - Hx))}\right) \quad (3)$$

$$LLR(b_{k,i}) = \log\left(\frac{\Sigma_{x \in X_{k,i}^+} \exp(-(Wy - WHx)^H (Wy - WHx))}{\Sigma_{x \in X_{k,i}^-} \exp(-(Wy - WHx)^H (Wy - WHx))}\right) \quad (4)$$

In Equation (3) and Equation (4), H denotes an $n_R \times n_T$ channel matrix, $b_{k,i}$ denotes an ith bit included in a transmitted symbol which the kth transmitting antenna transmits, $X_{k,i}^+$ denotes a set of transmitted symbol vectors of which a jth bit included in the transmitted symbol which the kth transmitting antenna transmits is '+1', and $X_{k,i}^-$ denotes a set of transmitted symbol vectors of which the jth bit included in the transmitted symbol which the kth transmitting antenna transmits is '-1'. Further, $n_R$ denotes the number of receiving antennas, and $n_T$ denotes the number of transmitting antennas, after an effective channel generator or the number of layers.

Equation (4) indicates an LLR that is detected when a whitening filter is applied.

Because Equation (3) and Equation (4) include many complex number multiplication computations, exponential function computations, and real number addition computations, Equation (3) and Equation (4) have a very high implementation complexity. Therefore, an optimal LLR is instead detected using a Max-Log-MAP scheme, e.g., as shown in Equation (5) and Equation (6), not the Log-MAP scheme as expressed in Equation (3) and Equation (4).

$$LLR(b_{k,i}) \approx \min_{x \in X_{k,i}^-} (y - Hx)^H R^{-1}(y - Hx) - \min_{x \in X_{k,i}^+} (y - Hx)^H R^{-1}(y - Hx) \quad (5)$$

$$LLR(b_{k,i}) \approx \min_{x \in X_{k,i}^-} (Wy - WHx)^H (Wy - WHx) - \min_{x \in X_{k,i}^+} (Wy - WHx)^H (Wy - WHx) \quad (6)$$

As shown in Equation (5) and Equation (6), an implementation complexity when the optimal LLR is detected using the Max-Log-MAP scheme is significantly decreased as compared to an implementation complexity when the optimal LLR is detected using the Log-MAP scheme.

As shown in Equations (3) to (6), upon generating an LLR, a signal receiving apparatus applies the same noise variance to all coded bits included in a codeword, or uses the same noise variance in a related unit by estimating a noise variance on a specific unit basis, if a strength of an interference signal is greater than or equal to threshold strength and the interference signal is irregular in a frequency domain or a time domain. For example, in an LTE mobile communication system, allocation of an interference signal is possible on a one resource block (RB) basis in the frequency domain, so the signal receiving apparatus may perform a noise estimating operation on one RB basis and use the noise estimated results for generating an LLR.

The above-described LLR generation scheme considers a noise variance, which is added in a channel. However, a channel estimation result that is greater than an additive noise may occur due to a limitation of a channel estimator in a specific channel environment. In this case, a channel decoding performance may be enhanced if an LLR is to be generated by applying a related component that is due to the limitation of the channel estimator. When an LLR is generated at a location at which an interference signal is cancelled, a channel decoding performance may be enhanced if the LLR is to be generated by applying a significantly decreased noise variance.

Therefore, in accordance with an embodiment of the present disclosure, a scheme is provided for generating an LLR in consideration of a variance of effective noise to which a noise component that occurs in a channel estimator included in a signal receiving apparatus is applied, not a variance of additive noise included in a received signal.

Figure 3:
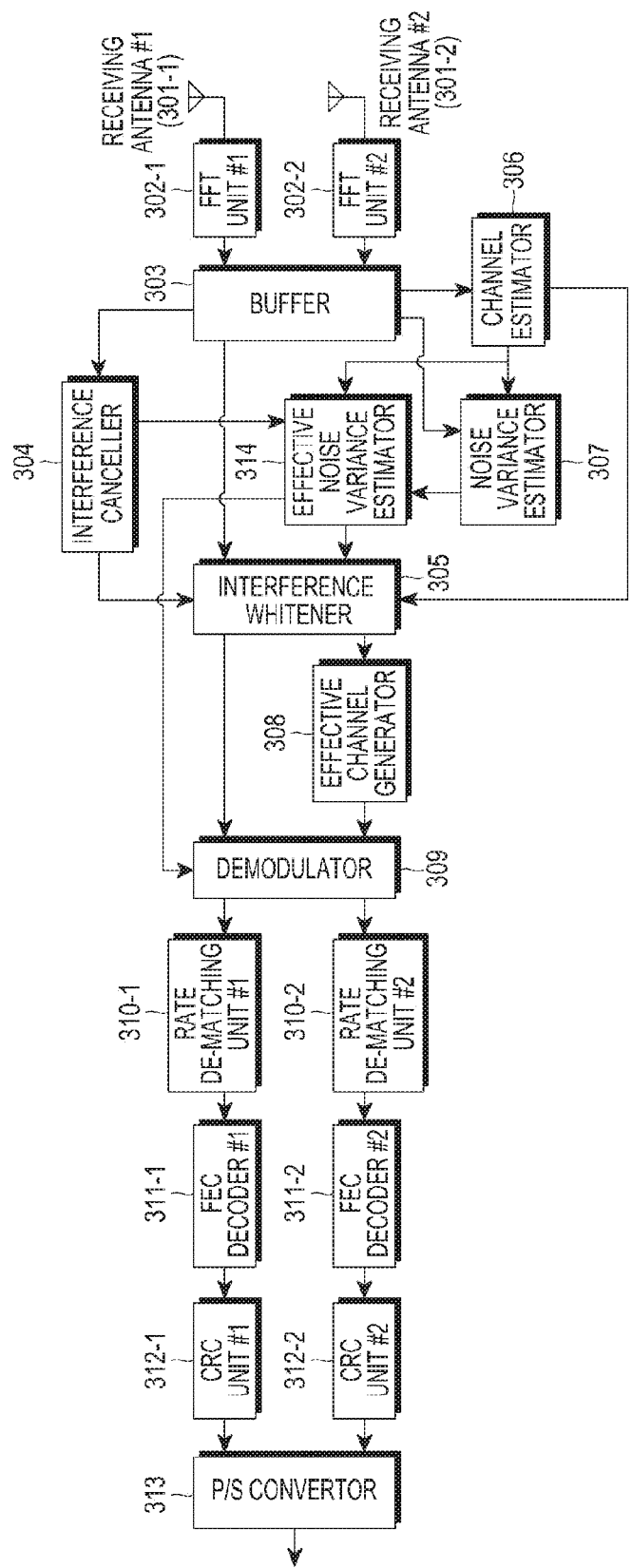
FIG. 3 illustrates a signal receiving apparatus in an LTE mobile communication system supporting a MIMO scheme according to an embodiment of the present disclosure.

FIG. 3 illustrates a signal receiving apparatus in an LTE mobile communication system supporting a MIMO scheme according to an embodiment of the present disclosure. Specifically, in FIG. 3, the signal receiving apparatus uses two receiving antennas, i.e., receiving antenna #1 301-1 and a receiving antenna #2 301-2. However, the number of antennas is not limited to two.

Referring to FIG. 3, the signal receiving apparatus includes the two receiving antennas, i.e., the receiving antenna #1 301-1 and the receiving antenna #2 301-2, two FFT units, i.e., an FFT unit #1 302-1 and an FFT unit #2 302-2, a buffer 303, an interference canceller 304, an interference whitener 305, a channel estimator 306, a noise variance estimator 307, an effective channel generator 308, a demodulator 309, two rate de-matching units, i.e., a rate de-matching unit #1 310-1 and a rate de-matching unit #2 310-2, two FEC decoders, i.e., an FEC decoder #1 311-1 and an FEC decoder #2 311-2, two CRC units, i.e., a CRC unit #1 312-1 and a CRC unit #2 312-2, a P/S convertor 313, and an effective noise variance estimator 314.

As illustrated in FIG. 3, compared to the signal receiving apparatus illustrated in FIG. 2, the signal receiving apparatus in FIG. 3 further includes the effective noise variance estimator 314 in order to perform a channel decoding operation by considering an influence of channel estimation noise in addition to additive noise, i.e., in order to generate an LLR in consideration of the additive noise and the channel estimation noise.

A signal received through the receiving antenna #1 301-1 is input to the FFT unit #1 302-1, which performs an FFT operation on the signal and outputs the FFT performed signal to the buffer 303.

A signal received through the receiving antenna #2 301-2 is input to the FFT unit #2 302-2, which performs an FFT operation on the signal and outputs the FFT performed signal to the buffer 303.

The buffer 303 buffers the signals output from the FFT unit #1 302-1 and the FFT unit #2 302-2, and outputs the buffered signals to the interference canceller 304, the interference whitener 305, the channel estimator 306, and the noise variance estimator 307.

The interference canceller 304 performs an interference canceling operation on the signal output from the buffer 303 based on a preset interference cancellation scheme and outputs the interference cancelled signal to the interference whitener 305. If the signal receiving apparatus is able to estimate all or a part of an interference signal, the interference canceller 304 performs the interference canceling operation. In an LTE mobile communication system, a cell-specific reference signal cancellation scheme in which an interference signal from an interference cell is cancelled is used for interference cancellation. Accordingly, in FIG. 3, the interference canceller 304 performs the interference cancelling based on the cell-specific reference signal cancellation scheme; however, interference cancellation scheme may also be implemented with various formats.

The channel estimator 306 performs a channel estimating operation on the signal output from the buffer 303 based on a preset channel estimation scheme and outputs the channel estimated signal to the noise variance estimator 307 and the effective noise variance estimator 314. For example, the channel estimator 306 performs the channel estimating operation based on a preset reference signal.

The noise variance estimator 307 performs a noise variance estimating operation on the signal output from the buffer 303 and the signal output from the channel estimator 306 and outputs the noise variance estimated signal to the effective noise variance estimator 314. The noise variance estimator 307 estimates a variance of additive noise from a received signal based on the reference signal and the signal output from the channel estimator 306, i.e., a channel estimation value. Herein, the additive noise includes an interference signal.

The effective noise variance estimator 314 performs an effective noise variance estimating operation on the signal output from the interference canceller 304, the signal output from the channel estimator 306, and the signal output from the effective noise variance estimator 314 and outputs the effective noise variance estimated signal to the interference whitener 305 and the demodulator 309.

The effective noise variance estimator 314 estimates an effective noise variance by adding a variance for noise added according to an operation of the channel estimator 306, i.e., a variance for channel estimation noise into the additive noise variance, which is estimated in the noise variance estimator 307. The channel estimation noise that occurs in the channel estimator 306 may change according to a channel estimation scheme that is used in the channel estimator 306 and a channel environment, and a scheme of estimating the channel estimation noise may be implemented with various formats. For example, a scheme for estimating the channel estimation noise may include estimating channel estimation noise through mathematical modeling, estimating channel estimation noise based on a simulation, estimating channel estimation noise based on a statistical characteristic determined through experimentation, etc.

If a channel decoding result is CRC good, the signal receiving apparatus measures a channel estimation noise variance by regenerating a transmitted signal, and may use the measured channel estimation noise variance, upon performing a channel decoding operation for a signal that is transmitted in a next processing time unit, e.g., a next transmitting time interval (TTI).

The signal output from the effective noise variance estimator 314 may be expressed as shown in Equation (7).

$$R_e = aR \tag{7}$$

In Equation (7), R denotes a variance for additive noise, and $R_c$ denotes a variance for effective noise. That is, the effective noise variance estimator 314 is equivalent to estimating 'a' in Equation (7).

A scheme for applying a variance of the effective noise, i.e., an effective noise variance, to the LLR as expressed in Equations (3) to (6) may include directly changing an effective noise variance that is input to the interference whitener 305 as expressed in Equation (7), changing a whitening filter that is used in the interference whitener 305 (wherein the whitening filter is equivalent to Equation (8) below), changing the LLR (wherein the LLR is equivalent to Equation (9) below), etc. Herein, the schemes for directly changing the effective noise variance that is input to the interference whitener 305 as expressed in Equation (7), the scheme for changing the whitening filter that is used in the interference whitener 305 (wherein the whitening filter is equivalent to Equation (8)), and the scheme for changing the LLR (wherein the LLR is equivalent to Equation (9)) provide the same as a result as when the effective noise variance is applied to Equations (3) to (6).

The scheme for applying the variance of the effective noise, i.e., the effective noise variance, to the LLR as expressed in Equations (3) to (6) is not limited to directly changing the effective noise variance that is input to the interference whitener 305 as expressed in Equation (7), the scheme for changing the whitening filter that is used in the interference whitener 305 (wherein the whitening filter is equivalent to Equation (8)), or the scheme for changing the LLR (wherein the LLR is equivalent to Equation (9)), and may be implemented with various other formats.

$$W_e = \frac{1}{a}W \tag{8}$$

$$LLR_e(b_{k,i}) = \frac{1}{a}LLR(b_{k,i}) \tag{9}$$

The interference whitener 305 performs an interference whitening operation on the signal output from the buffer 303, the signal output from the interference canceller 304, the signal output from the channel estimator 306, and the signal output from the effective noise variance estimator 314 based on a preset interference whitening scheme and outputs the interference whitened signal to the effective channel generator 308 and the demodulator 309. If the additive noise estimated in the effective noise variance estimator 314 is spatially correlated, the interference whitener 305 applies the same whitening filter to the channel estimation value estimated in the channel estimator 306 and the received signal in order to implement a simple demodulator. The interference whitener 305 outputs an effective noise variance to the demodulator 309, after the interference whitening operation. The received signal may be the signal output from the buffer 303 or the signal output from the interference canceller 304, depending on whether an interference signal is cancelled.

The effective channel generator 308 applies an influence of a pre-coding scheme that is applied in a signal transmitting apparatus to the signal output from the interference whitener 305, and outputs the signal to which the influence of the pre-coding scheme is applied to the demodulator 309.

As described above, in an LTE mobile communication system, two types of reference signal signals, i.e., a cell-specific reference signal and a UE-specific reference signal, may be used for channel estimation. The cell-specific reference signal is commonly used for all UEs, and the UE-specific reference signal is used for a specific UE. In the LTE mobile communication system, when a pre-coding scheme is not applied to the cell-specific reference signal, the effective channel generator 308 applies the influence of the pre-coding scheme to the signal output from the interference whitener 305. Alternatively, in the LTE mobile communication system, when a pre-coding scheme is applied to the UE-specific reference signal, the effective channel generator 308 may be omitted, or does not perform any operation even though the effective channel generator 308 is implemented.

The demodulator 309 performs a demodulating operation on the signal output from the interference whitener 305 and the signal output from the effective channel generator 308 based on a demodulation scheme corresponding to a modulation scheme used in the signal transmitting apparatus, and outputs the demodulated signal to the rate de-matching unit #1 310-1 and the rate de-matching unit #2 310-2. The demodulator 309 generates an LLR using the interference whitened effective channel, a received signal (or a received signal from which the interference signal is cancelled), and an effective noise variance and outputs the generated LLR to the rate de-matching unit #1 310-1 and the rate de-matching unit #2 310-2.

The rate de-matching unit #1 310-1 performs a rate de-matching operation on the signal output from the demodulator 309 based on a rate de-matching scheme corresponding to a rate matching scheme used in the signal transmitting apparatus, and outputs the rate de-matched signal to the FEC decoder #1 311-1. The FEC decoder #1 311-1 performs a decoding operation on the signal output from the rate de-matching unit #1 310-1 based on an FEC decoding scheme corresponding to an FEC coding scheme used in the signal transmitting apparatus, and outputs the FEC decoded signal to the CRC unit #1 312-1. The CRC unit #1 312-1 performs a CRC checking operation on the signal output from the FEC decoder #1 311-1 and outputs the CRC checked signal to the P/S convertor 313.

The rate de-matching unit #3 310-2 performs a rate de-matching operation on the signal output from the demodulator 309 based on a rate de-matching scheme corresponding to a rate matching scheme used in the signal transmitting apparatus, and outputs the rate de-matched signal to the FEC decoder #2 311-2. The FEC decoder #2 311-2 performs a decoding operation on the signal output from the rate de-matching unit #2 310-2 based on an FEC decoding scheme corresponding to an FEC coding scheme used in the signal transmitting apparatus, and outputs the FEC decoded signal to the CRC unit #2 312-2. The CRC unit #2 312-2 performs a CRC checking operation on the signal output from the FEC decoder #2 311-2 and outputs the CRC checked signal to the P/S convertor 313.

The P/S convertor 313 converts the signals output from the CRC unit #1 312-1 and the CRC unit #2 312-2 into a serial signal and outputs the serial signal.

While the receiving antenna #1 301-1 and the receiving antenna #2 301-2, the FFT unit #1 302-1 and the FFT unit #2 302-2, the buffer 303, the interference canceller 304, the interference whitener 305, the channel estimator 306, the noise variance estimator 307, the effective channel generator 308, the demodulator 309, the rate de-matching unit #1 310-1 and the rate de-matching unit #2 310-2, the FEC decoder #1 311-1 and the FEC decoder #2 311-2, the CRC unit #1 312-1 and the CRC unit #2 312-2, the P/S convertor 313, and the effective noise variance estimator 314 are illustrated and described as separate components, alternatively, two or more of the receiving antenna #1 301-1 and the receiving antenna #2 301-2, the FFT unit #1 302-1 and the FFT unit #2 302-2, the buffer 303, the interference canceller 304, the interference whitener 305, the channel estimator 306, the noise variance estimator 307, the effective channel generator 308, the demodulator 309, the rate de-matching unit #1 310-1 and the rate de-matching unit #2 310-2, the FEC decoder #1 311-1 and the FEC decoder #2 311-2, the CRC unit #1 312-1 and the CRC unit #2 312-2, the P/S convertor 313, and the effective noise variance estimator 314 may be incorporated into a single component.

Figure 4:
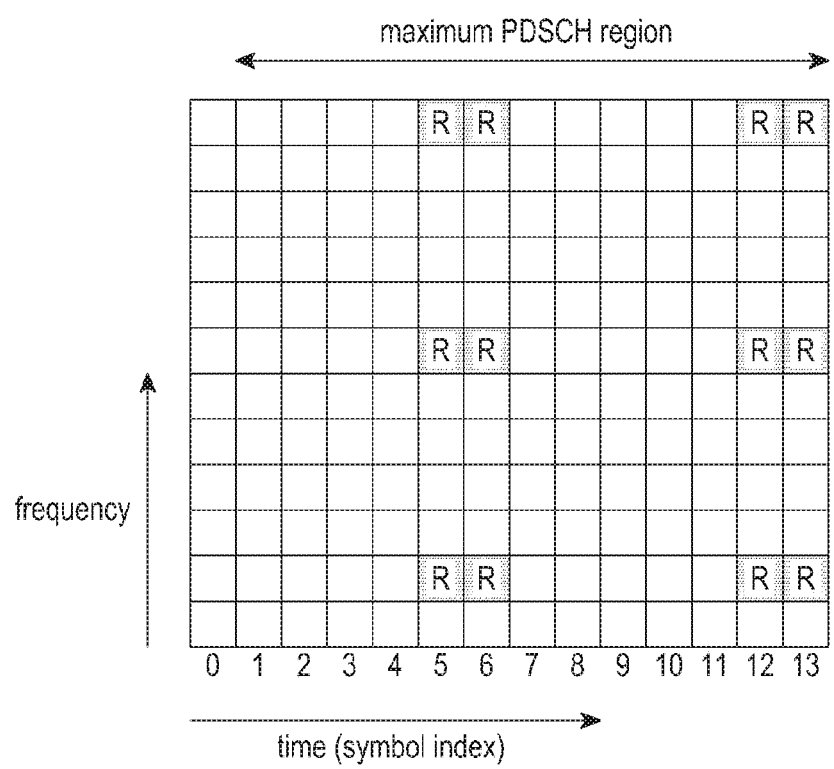
FIG. 4 illustrates reference signal mapping used in an LTE mobile communication system supporting a MIMO scheme according to an embodiment of the present disclosure.

FIG. 4 illustrates reference signal mapping used in an LTE mobile communication system supporting a MIMO scheme according to an embodiment of the present disclosure.

Specifically, the reference signal mapping in FIG. 4 indicates a distribution of a reference signal used when a transmission mode (TM) 8 is applied. For example, the reference signal mapping indicates reference signal mapping in a PDSCH region in which data is transmitted.

In FIG. 4, a region illustrated as 'R' indicates a region in which a reference signal is transmitted. Further, a reference signal used for a channel estimating operation is transmitted in a specific region of the PDSCH region, and a channel estimation error may be significantly changed according to a distance from a reference signal, if a channel is a time varying channel. For example, if the wireless channels vary rapidly in a time domain, channel estimation error for a given position increases as the distance between the target position and the reference signals (or pilot signal) increases because channel estimator obtains the estimated channel value at the target position by using the reference signals, and the correlation between a channel value at the target position and a channel value at the reference signal decreases in rapidly time varying channel as the distance between the target position and the reference signal increases.

Figure 5:
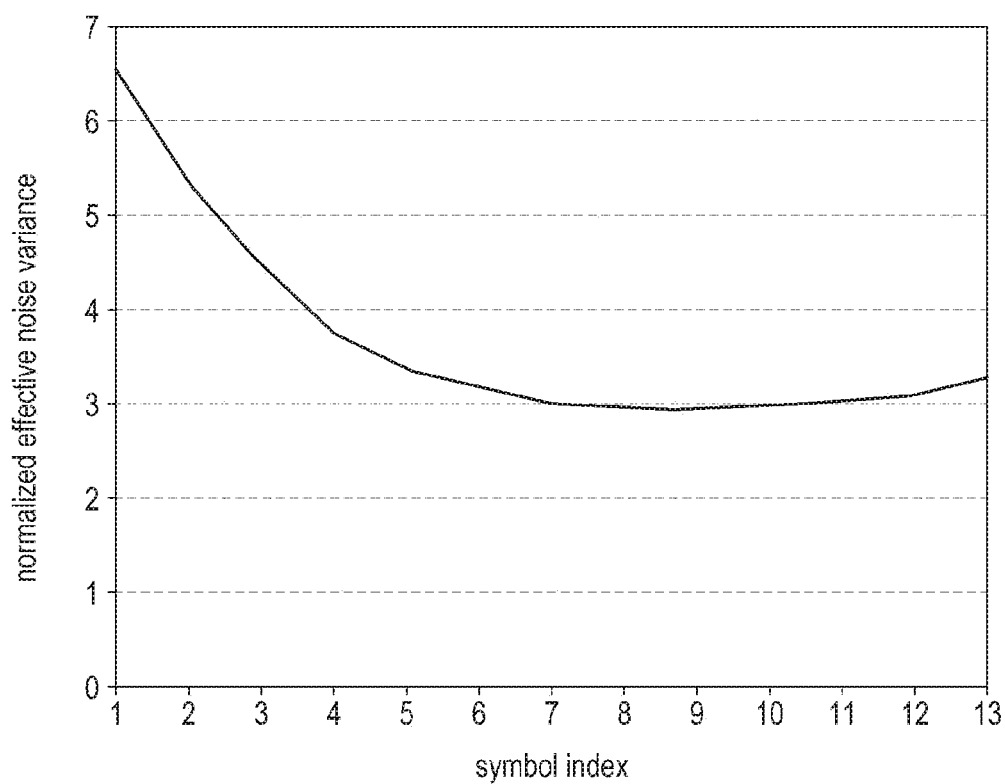
FIG. 5 illustrates normalized effective noise variance according to a symbol index in a physical downlink shared channel (PDSCH) region in an LTE mobile communication system supporting a MIMO scheme according to an embodiment of the present disclosure.

FIG. 5 illustrates a normalized effective noise variance according to a symbol index in a PDSCH region in an LTE mobile communication system supporting a MIMO scheme according to an embodiment of the present disclosure.

Referring to FIG. 5, the normalized effective noise variance is acquired according to a symbol index in a PDSCH region, e.g., as illustrated in FIG. 4, in an extended typical urban (ETU) 150 Hz 30 dB channel environment. Here, normalization denotes a value that is generated by dividing an effective noise variance per symbol by a noise variance that is added in a channel.

As illustrated in FIG. 5, the normalized effective noise variance has a large deviation per symbol index in a channel environment due to channel estimation noise (or a channel estimation error), which is added within a signal receiving apparatus, even though the same additive noise is added. In a high SNR region, a channel estimation noise variance component, which occurs due to a channel estimating operation, is greater than an additive noise variance component that occurs in a channel.

Figure 6:
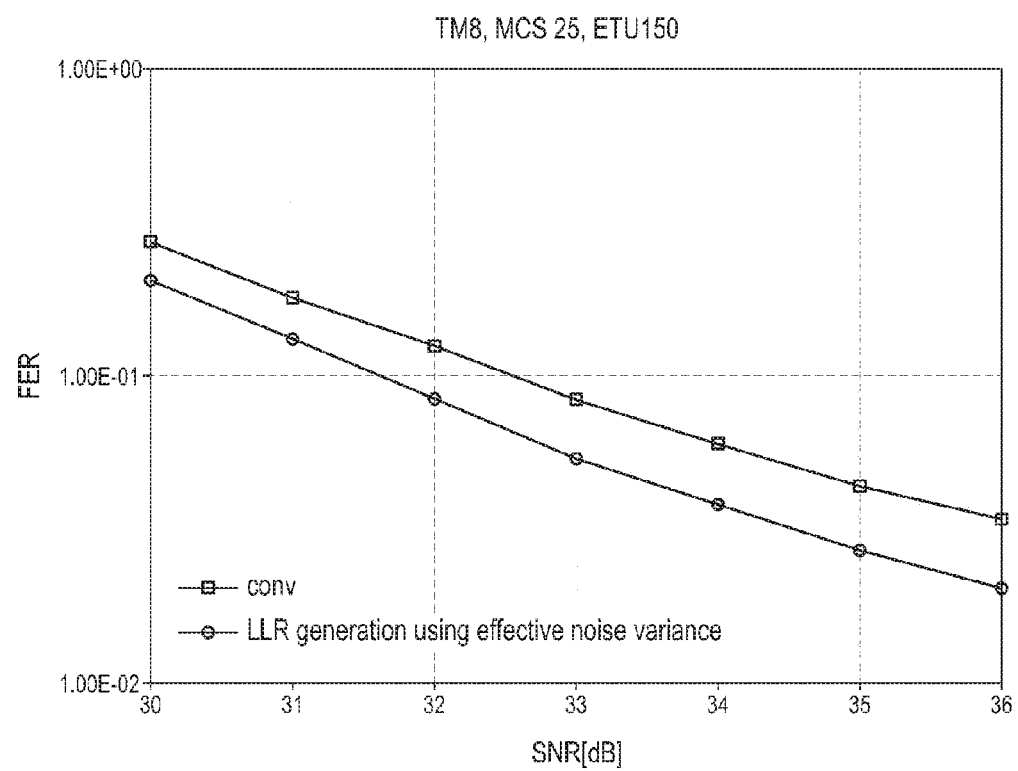
FIG. 6 illustrates a receiving performance according to an LLR which is generated by applying an effective noise variance in an LTE mobile communication system supporting a MIMO scheme according to an embodiment of the present disclosure.

FIG. 6 illustrates receiving performance according to an LLR that is generated by applying an effective noise variance in an LTE mobile communication system supporting a MIMO scheme according to an embodiment of the present disclosure.

Referring to FIG. 6, a performance graph illustrated as 'conv' indicates a PDSCH receiving performance when an LLR is generated by applying a general LLR generation scheme, i.e., by equally applying additive noise that occurs in a channel environment to an entire PDSCH region, and a performance graph illustrated as 'LLR generating using effective noise variance' indicates a PDSCH receiving performance according to an embodiment of the present disclosure, i.e., a PDSCH receiving performance when an LLR is generated by applying an effective noise variance that is different per symbol index using a statistical characteristic, as illustrated in FIG. 5. Further, in FIG. 6, each of the performance graphs indicates a PDSCH receiving performance in an ETU 150 Hz 30 dB channel environment, a vertical axis indicates a frame error rate (FER), and a horizontal axis indicates an SNR.

As illustrated in FIG. 6, a PDSCH receiving performance when an LLR is generated by an applying effective noise variance that is different per symbol has an approximate 0.8 dB performance gain, as compared to a PDSCH receiving performance when an LLR is generated by applying an additive noise variance.

In accordance with an embodiment of the present disclosure, a signal receiving apparatus detects a specific channel environment in advance, detects a statistical characteristic for effective noise variance through a simulation or measurement in advance in the specific channel environment, and generates an LLR by applying the effective noise variance.

Alternatively, an LLR may be generated by applying an effective noise variance based on a characteristic of a channel estimating scheme that is used in a signal receiving apparatus, which will be described below.

If the signal receiving apparatus uses a minimum mean square error (MMSE) scheme, upon estimating a time domain channel, a channel estimation error may be expressed as shown in Equation (10).

$$1 - R_{dp}\left(R_{pp} + \frac{1}{2SNR}\right)^{-1} R_{dp}^{H} \qquad (10)$$

In Equation (10), $R_{dp}$ denotes cross correlation between data (a location for which data estimation is required) and a pilot signal, i.e., a reference signal, and $R_{pp}$ denotes auto correlation among pilot signals.

Figure 7:
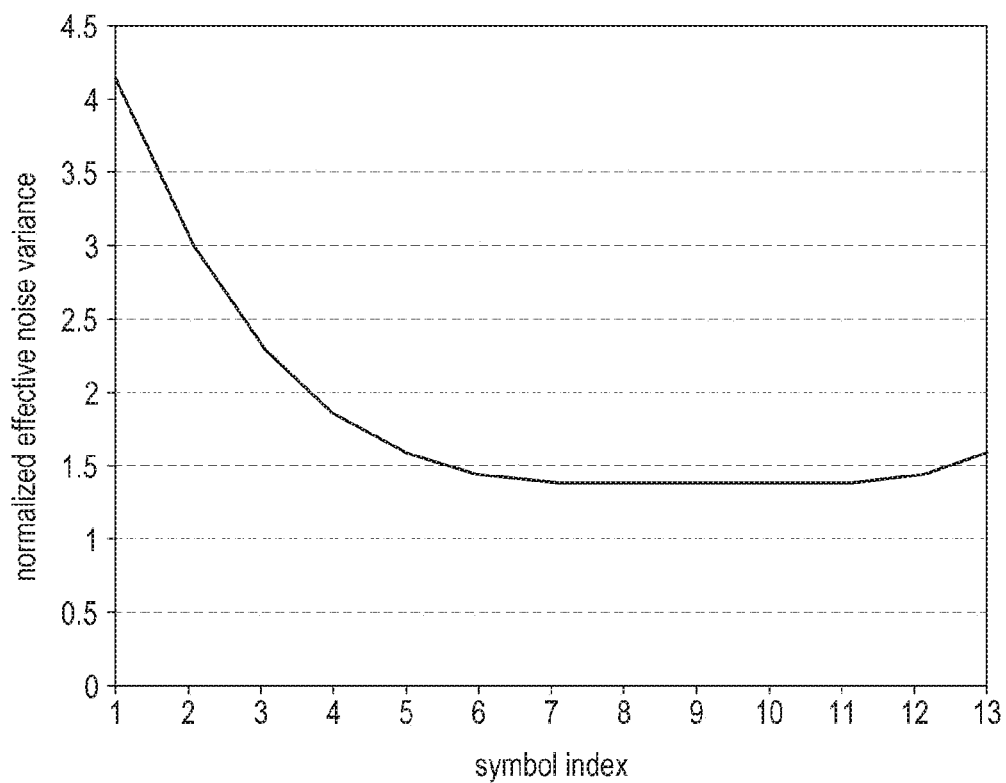
FIG. 7 illustrates a normalized effective noise variance which is added according to a symbol index in a PDSCH region according to a channel estimation error in an LTE mobile communication system supporting a MIMO scheme according to an embodiment of the present disclosure.

FIG. 7 illustrates a normalized effective noise variance that is added according to a symbol index in a PDSCH region according to a channel estimation error in an LTE mobile communication system supporting a MIMO scheme according to an embodiment of the present disclosure.

Referring to FIG. 7, the normalized effective noise variance is acquired according to a symbol index in a PDSCH region, e.g., as illustrated in FIG. 4, in an ETU 150 Hz 30 dB channel environment.

As illustrated in FIG. 7, the normalized effective noise variance has a large deviation per symbol index in a channel environment due to channel estimation noise (or a channel estimation error), which is added within a signal receiving apparatus, even though the same additive noise is added. In a high SNR region, a channel estimation noise variance component that occurs due to a channel estimating operation is greater than an additive noise variance component that occurs in a channel.

The normalized effective noise variance, as illustrated in FIG. 7, is less than the normalized effective noise variance, as illustrated in FIG. 5, because a channel estimation error in a time domain is considered.

Figure 8:
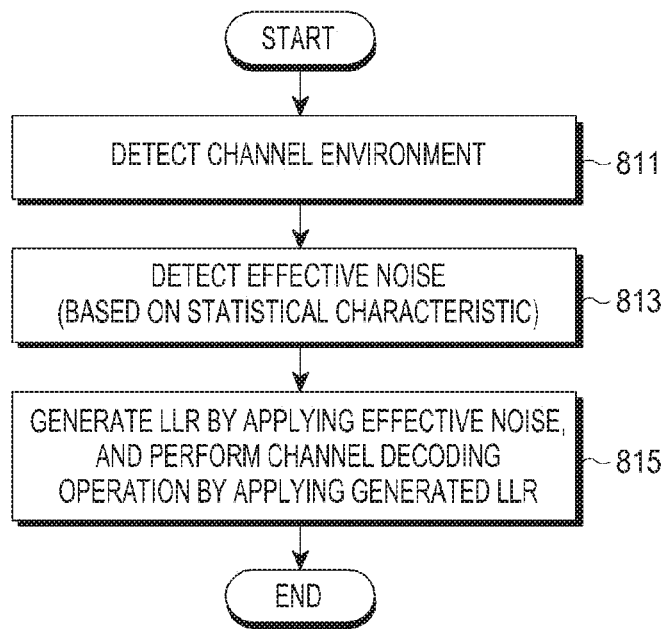
FIG. 8 is a flowchart illustrating an operating process of a signal receiving apparatus in an LTE mobile communication system supporting a MIMO scheme according to an embodiment of the present disclosure.

FIG. 8 is a flowchart illustrating an operating process of a signal receiving apparatus in an LTE mobile communication system supporting a MIMO scheme according to an embodiment of the present disclosure. Specifically, FIG. 8 illustrates an operating process of a signal receiving apparatus, which is based on a statistical characteristic of effective noise due to a channel estimation error through simulation or experimentation.

The signal receiving apparatus detects distribution of a reference signal per transmission, which affects effective noise, and an interval during which the effective noise seriously changes in advance, and stores information indicating a variance of effective noise per LLR location by measuring a variance of the effective noise through simulation or experimentation. Here, the channel environment includes a delay power profile, a Doppler spread, a signal to interference and noise ratio (SINR), etc.

Referring to FIG. 8, the signal receiving apparatus detects a channel environment in step 811. For example, the signal receiving apparatus detects the channel environment based on channel estimation results.

In step 813, the signal receiving apparatus detects effective noise to be used for generating an LLR based on a reference signal distribution used for a related transmission and the detected channel environment. In step 815, the signal receiving apparatus generates an LLR by applying the detected effective noise, and performs a channel decoding operation by applying the generated LLR. That is, the signal receiving apparatus generates the LLR by applying the effective noise to an interference whitener and a whitening filter, or directly applying the effective noise, and performs the channel decoding operation by applying the generated LLR.

Although FIG. 8 illustrates an example of an operating process of a signal receiving apparatus in an LTE mobile communication system supporting a MIMO scheme according to an embodiment of the present disclosure, various changes could be made to FIG. 8. For example, although illustrated as a series of steps, various steps in FIG. 8 could overlap, occur in parallel, occur in a different order, or occur multiple times.

Figure 9:
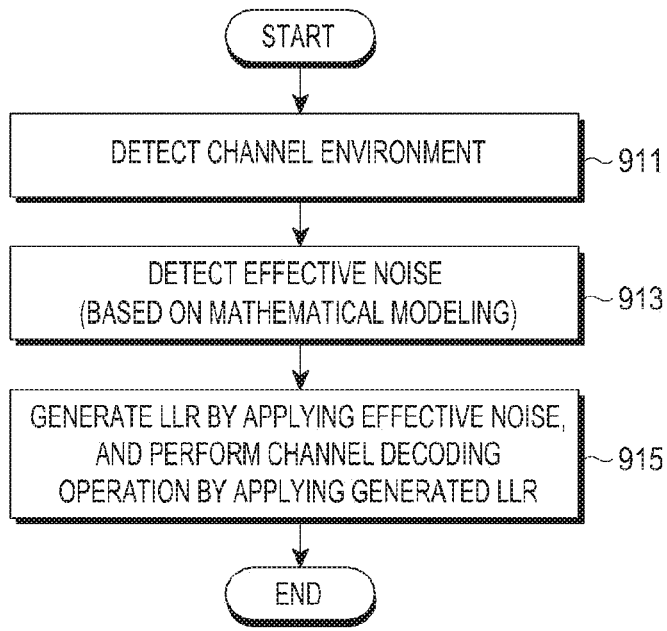
FIG. 9 is a flowchart illustrating an operating process of a signal receiving apparatus in an LTE mobile communication system supporting a MIMO scheme according to an embodiment of the present disclosure.

FIG. 9 is a flowchart illustrating an operating process of a signal receiving apparatus in an LTE mobile communication system supporting a MIMO scheme according to an embodiment of the present disclosure. Specifically, in FIG. 9, the operating process is based on mathematical modeling of effective noise due to a channel estimation error.

Referring to FIG. 9, in step 911, the signal receiving apparatus detects a channel environment. Herein, the channel environment includes a delay power profile, a Doppler spread, an SINR, etc. For example, the signal receiving apparatus detects the channel environment based on channel estimation results.

In step 913, the signal receiving apparatus detects effective noise to be used for generating an LLR by calculating a channel estimation error in the detected channel environment based on a channel estimation scheme applied to a related channel environment.

In step 915, the signal receiving apparatus generates an LLR by applying the detected effective noise, and performs a channel decoding operation by applying the generated LLR. That is, the signal receiving apparatus generates the LLR by applying the effective noise to an interference whitener and a whitening filter, or by directly applying the effective noise, and performs the channel decoding operation by applying the generated LLR.

Although FIG. 9 illustrates another example of an operating process of a signal receiving apparatus in an LTE mobile communication system supporting a MIMO scheme according to an embodiment of the present disclosure, various changes could be made to FIG. 9. For example, although illustrated as a series of steps, various steps in FIG. 9 could overlap, occur in parallel, occur in a different order, or occur multiple times.

As described above, in accordance with an embodiment of the present disclosure, a channel estimation noise is determined based on at least one of a channel environment, a channel estimation scheme that is used in a signal receiving apparatus, a location at which a channel is estimated in the signal receiving apparatus, and distribution of a reference signal.

In accordance with an embodiment of the present disclosure, an effective noise or an LLR is detected based on regions in which a channel estimation noise is different within an entire transmitting region between a signal receiving apparatus and a signal transmitting apparatus. That is, in accordance with an embodiment of the present disclosure, the effective noise or the LLR is detected based on the regions in which the channel estimation noise is different, not the entire transmitting region between the signal receiving apparatus and the signal transmitting apparatus.

The channel estimation noise may be changed based on a channel environment, a channel estimation scheme that is used in the signal receiving apparatus, distribution of a reference signal, etc.

The channel environment includes at least one of a delay power profile, a Doppler spread, and an SINR.

Figure 10:
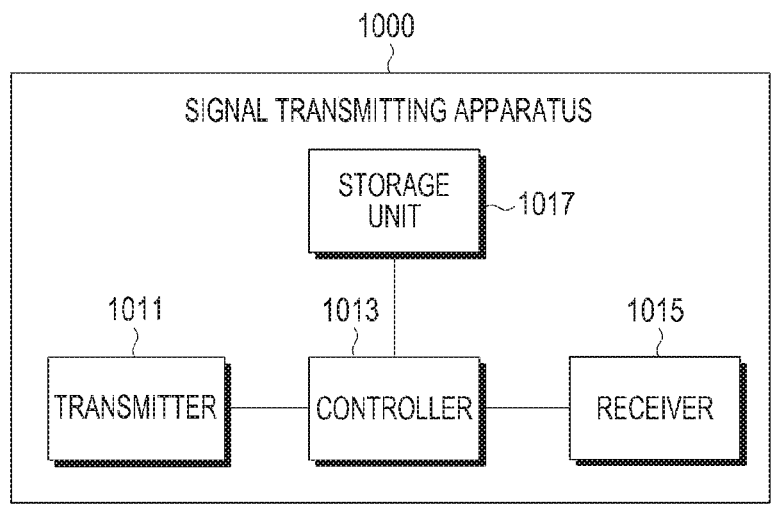
FIG. 10 illustrates a signal transmitting apparatus in an LTE mobile communication system supporting a MIMO scheme according to an embodiment of the present disclosure.

FIG. 10 illustrates a signal transmitting apparatus in an LTE mobile communication system supporting a MIMO scheme according to an embodiment of the present disclosure.

Referring to FIG. 10, a signal transmitting apparatus 1000 includes a transmitter 1011, a controller 1013, a receiver 1015, and a storage unit 1017.

The controller 1013 controls the overall operation of the signal transmitting apparatus 1000. More particularly, the controller 1013 controls the signal transmitting apparatus 1000 to perform operations related to decoding a channel according to an embodiment of the present disclosure, i.e., generating an LLR in consideration of an effective noise, in the manner described above with reference to FIGS. 1 to 9.

The transmitter 1011 transmits various signals, various messages, and the like under a control of the controller 1013. The various signals, the various messages, and the like transmitted by the transmitter 1011 have been described above with reference to FIGS. 1 to 9, and a description thereof will be omitted herein.

The receiver 1015 receives various signals, various messages, and the like under a control of the controller 1013. The various signals, the various messages, and the like received by the receiver 1015 have been described above with reference to FIGS. 1 to 9, and a description thereof will be omitted herein.

The storage unit 1017 stores a program and various data for the operation of the signal transmitting apparatus 1000, information related to decoding the channel according to an embodiment of the present disclosure, i.e., generating the LLR in consideration of the effective noise. Further, the storage unit 1017 stores the various signals, the various messages, and the like received by the receiver 1015.

While the transmitter 1011, the controller 1013, the receiver 1015, and the storage unit 1017 are illustrated and described as separate components, it is to be understood that this is merely for convenience of description. In other words, two or more of the transmitter 1011, the controller 1013, the receiver 1015, and the storage unit 1017 may be incorporated into a single component. For example, the transmitter 1011 and the receiver 1015 can be embodied as a single transceiver.

Figure 11:
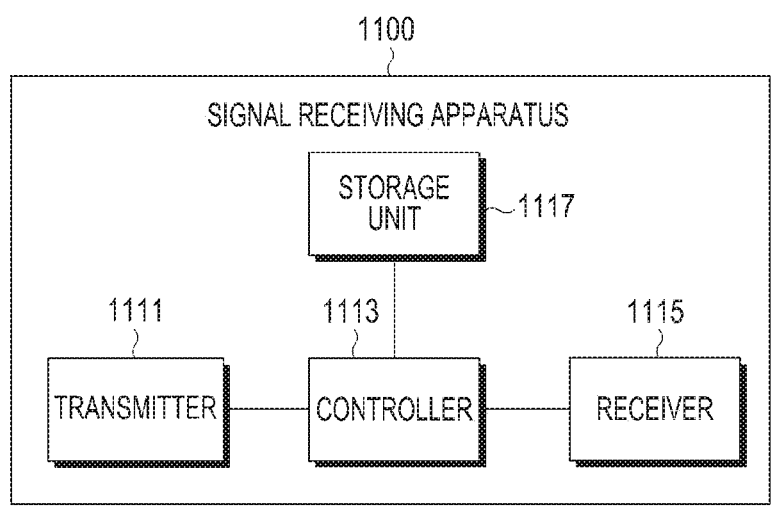
FIG. 11 illustrates a signal receiving apparatus in an LTE mobile communication system supporting a MIMO scheme according to an embodiment of the present disclosure.

FIG. 11 illustrates a signal receiving apparatus in an LTE mobile communication system supporting a MIMO scheme according to an embodiment of the present disclosure.

Referring to FIG. 11, a signal receiving apparatus 1100 includes a transmitter 1111, a controller 1113, a receiver 1115, and a storage unit 1117.

The controller 1113 controls the overall operation of the signal receiving apparatus 1100. More particularly, the controller 1113 controls the signal receiving apparatus 1100 to perform an operation related to decoding a channel according to an embodiment of the present disclosure, i.e., generating an LLR in consideration of an effective noise, in the manner described with reference to FIGS. 1 to 9 above.

The transmitter 1111 transmits various signals, various messages, and the like under a control of the controller 1113. The various signals, the various messages, and the like transmitted by the transmitter 1111 have been described above with reference to FIGS. 1 to 9, and a description thereof will be omitted herein.

The receiver 1115 receives various signals, various messages, and the like under a control of the controller 1113. The various signals, the various messages and the like received in the receiver 1115 have also been described above with reference to FIGS. 1 to 9, and a description thereof will be omitted herein.

The storage unit 1117 stores a program and various data for the operation of the signal receiving apparatus 1100, information related to the operation related to decoding the channel according to an embodiment of the present disclosure, i.e., generating the LLR in consideration of the effective noise. The storage unit 1117 also stores the various signals, the various messages, and the like received by the receiver 1115.

While the transmitter 1111, the controller 1113, the receiver 1115, and the storage unit 1117 are illustrated and described as separate components, it is to be understood that this is merely for convenience of description. In other words, two or more of the transmitter 1111, the controller 1113, the receiver 1115, and the storage unit 1117 may be incorporated into a single component. For example, the transmitter 1111 and the receiver 1115 can be embodied as a single transceiver.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), compact disk (CD)-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It should also be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, etc.).

Further, a method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. A method for performing, by a signal receiving apparatus in a mobile communication system, a channel decoding operation based on effective noise, the method comprising:
   detecting a channel estimation noise that occurs during a channel estimating operation performed in the signal receiving apparatus, the channel estimation noise being separate from an additive noise that occurs in a channel environment between the signal receiving apparatus and a signal transmitting apparatus;
   generating a log likelihood ratio (LLR) based only on regions in which the channel estimation noise is different within a transmitting region between the signal receiving apparatus and the signal transmitting apparatus, the regions being detected based on the channel environment; and
   performing a channel decoding operation based on the generated LLR.

2. The method of claim 1, wherein generating the LLR comprises generating the LLR based on the channel estimation noise and the additive noise.

3. The method of claim 2, wherein the channel environment includes at least one of a delay power profile, a Doppler spread, and a signal to interference and noise ratio (SINR).

4. The method of claim 1, wherein the channel estimation noise is estimated using at least one of mathematical modeling, a simulation, and a statistical characteristic.

5. The method of claim 1, wherein the channel estimation noise is determined corresponding to a channel estimation scheme used in the signal receiving apparatus.

6. The method of claim 1, wherein the channel estimation noise is determined based on at least one of a channel environment between the signal receiving apparatus and a signal transmitting apparatus, a channel estimation scheme used in the signal receiving apparatus, a location at which a channel is estimated in the signal receiving apparatus, and a distribution of a reference signal.

7. The method of claim 1, wherein the channel environment includes at least one of a delay power profile, a Doppler spread, and a signal to interference and noise ratio (SINR).

8. A signal receiving apparatus in a mobile communication system, the signal receiving apparatus comprising:
   a receiver; and
   a controller configured to detect channel estimation noise that occurs during a channel estimating operation performed in the signal receiving apparatus, to generate a log likelihood ratio (LLR) based only on regions in which the channel estimation noise is different within a transmitting region between the signal receiving apparatus and a signal transmitting apparatus, the regions being detected based on a channel environment between the signal receiving apparatus and the signal transmitting apparatus, and to decode a channel based on the generated LLR, the channel estimation noise being separate from an additive noise that occurs in the channel environment.

9. The signal receiving apparatus of claim 8, wherein the controller generates the LLR based on the channel estimation noise and the additive noise.

10. The signal receiving apparatus of claim 9, wherein the channel environment includes at least one of a delay power profile, Doppler spread, and a signal to interference and noise ratio (SINR).

11. The signal receiving apparatus of claim 8, wherein the channel estimation noise is estimated using at least one of mathematical modeling, a simulation, and a statistical characteristic.

12. The signal receiving apparatus of claim 8, wherein the channel estimation noise is determined based on a channel estimation scheme used in the signal receiving apparatus.

13. The signal receiving apparatus of claim 8, wherein the channel estimation noise is determined based on at least one of the channel environment between the signal receiving apparatus and a signal transmitting apparatus, a channel estimation scheme used in the signal receiving apparatus, a location at which a channel is estimated in the signal receiving apparatus, and a distribution of a reference signal.

14. The signal receiving apparatus of claim 8, wherein the channel environment includes at least one of a delay power profile, a Doppler spread, and a signal to interference and noise ratio (SINR).

15. A non-transitory computer readable recording medium containing one or more programs which when executed implement the steps of:
   detecting a channel estimation noise that occurs during a channel estimating operation performed in a signal receiving apparatus, the channel estimation noise being separate from an additive noise that occurs in a channel environment between the signal receiving apparatus and a signal transmitting apparatus;
   generating a log likelihood ratio (LLR) based only on regions in which the channel estimation noise is different within a transmitting region between the signal receiving apparatus and the signal transmitting apparatus, the regions being detected based on the channel environment;
   and performing a channel decoding operation based on the generated LLR.

16. The non-transitory computer readable recording medium of claim 15, wherein the LLR is generated based on the channel estimation noise and the additive noise.

17. The non-transitory computer readable recording medium of claim 15, wherein the channel estimation noise is estimated using at least one of mathematical modeling, a simulation, and a statistical characteristic.

18. The non-transitory computer readable recording medium of claim 15, wherein the channel estimation noise is determined based on a channel estimation scheme used in the signal receiving apparatus.

* * * * *